United States Patent
Goldberg et al.

(10) Patent No.: US 7,280,841 B2
(45) Date of Patent: Oct. 9, 2007

(54) SYSTEM FOR CONTROLLING POWER ON A MOBILE STATION AND SUPPORTING METHOD AND APPARATUS

(75) Inventors: Mark A. Goldberg, Davie, FL (US); Stephen S. Shiao, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 78 days.

(21) Appl. No.: 11/017,080

(22) Filed: Dec. 20, 2004

(65) Prior Publication Data

US 2006/0135095 A1 Jun. 22, 2006

(51) Int. Cl.
*H04B 7/00* (2006.01)
(52) U.S. Cl. .................... 455/522; 455/127.2; 375/296
(58) Field of Classification Search ................ 455/522, 455/127.2, 108, 115; 375/296
See application file for complete search history.

(56) References Cited

U.S. PATENT DOCUMENTS

| 5,638,403 | A | 6/1997 | Birchler et al. | |
|---|---|---|---|---|
| 6,957,087 | B1 * | 10/2005 | Hedberg | 455/561 |
| 2003/0092405 | A1 * | 5/2003 | Groe et al. | 455/108 |
| 2006/0030352 | A1 * | 2/2006 | Kiran et al. | 455/522 |

* cited by examiner

*Primary Examiner*—Sanh D. Phu

(57) ABSTRACT

In the present power control technique, a power control circuit (404) that is operably coupled to a receiver circuit (412) assesses (514, 522) a tclip adjust value based on a power cutback value from the receiver circuit. The tclip adjust value is forwarded to a peak to average ratio control circuit (402) operably coupled to the power control circuit (404), and using the tclip adjust value, an adjust peak power signal is accordingly assessed (612).

16 Claims, 5 Drawing Sheets

SYSTEM FOR CONTROLLING POWER ON A MOBILE STATION AND SUPPORTING METHOD AND APPARATUS

TECHNICAL FIELD

This invention relates generally to a power control technique on a mobile station.

BACKGROUND

Power control techniques are commonly used in wireless communication systems for reducing interference levels, prolonging battery life, and/or reducing dynamic range requirements of the base station receiver. Conventional power control systems generally cutback the transmission power of the mobile station when it is in close proximity to the serving base station. The amount of cutback applied is usually inversely proportionate to the distance between the base station and the mobile station. In other words, more cutback of the transmission power would be applied as the mobile station gets closer to the base station. This general method of power control is quite common and is generally known in the art. Moreover, since current cell phones have many similar functions to that of computer devices, a mobile station will be herein used to refer to any device that requires a power control system, which includes, but is not limited to, cell phones, personal digital assistants, and/or computers.

Digital communication systems often employ linear signaling methods to obtain maximum information rate in a limited band. In these methods, information is contained in the phase and amplitude components of the signal. This type of signaling, however, imposes strict linearity requirements on the transmitter power amplifier ("PA"). Despite such requirements, the PAs can only operate linearly over a limited range of signal levels. If the dynamic range of the input signal exceeds the linear operating range of the PA, nonlinear distortion will result, which causes signal splatter and potential loss of information. Thus, systems often employ dynamic range control techniques in order to ensure this type of power amplifier linearity is maintained. A common technique is to attenuate signal peaks, and thereby limit the range of input levels to the PA. This type of approach generally reduces the peak to average ratio ("PAR") of the signal, and there are several well known benefits of PAR control in amplitude modulated systems. For example, some of those benefits include a maximized average transmit power, a higher PA efficiency, a longer battery life, and a reduced system cost.

In particular, FIG. 1 shows a conventional system employing PAR control and power cutback, which is indicated generally at 100. In this particular system shown, there are two major controls, which are a PAR control 102 that reduces the peak level of the signal and a power control 104 that controls the transmit power of a connected receiver 106, that controls the power of the PA 108. On the side of the PAR control 102, other typical component circuits are found coupled to the PAR control. For example, a data source circuit 110 that provides data to be transmitted is operably coupled to an encoder circuit 112 that protects the data from channel impairments. The encoder circuit 112 is then coupled to a modulator circuit 114 that formats the data for signaling across the channel, and the PAR control 102 is used to control the peak level of the signal from the encoder circuit 112.

In order to control the peak level of the signal, the PAR control circuit 102 uses a parameter tclip to establish a threshold for peak limiting. Whenever the signal envelope exceeds this tclip parameter, the PAR control circuit 102 applies a controlled amount of attenuation or clipping centered about the peak of the envelope. In this case, larger peaks are attenuated more than smaller peaks. As a result, a reduced and relatively constant PAR at the output of the PAR control circuit 102 is generated, enabling the PA 108 to operate within its linear range. Both outputs from the PAR control circuit 102 and power control circuit 104 are forwarded to a variable gain amplifier 116, which controls the transmit power, that outputs a baseband signal to a digital-to-analog ("D/A") converter circuit 118. A mixer 120 that is coupled to the D/A converter circuit 118 and a local oscillator 122 then translates the signal to a radio frequency ("RF") signal to the PA 108, which is coupled to an antenna 124 for forwarding the RF signal onto the channel.

Turning now to FIG. 2, the function of the power control circuit 104 in a conventional transceiver design is shown and indicated generally at 200. An input of the system's current operating cutback level 202, which is signaled to the transmitter through the receiver, is received from the receiver 106 (shown in FIG. 1). As shown, the current operating cutback level 202 represented in dB is mapped into a linear gain control circuit 204, which outputs a gain control signal 206 to the variable gain amplifier 116 (shown in FIG. 1). This gain control signal 206 is reduced in proportion to the amount of cutback applied by the system. Although, as shown, both the PAR control circuit 102 and the power control circuit 104 ultimately controls the power of the PA 108, each of the circuits has no idea what the other circuit is doing to the power adjustment of the system. Since the PAR control 102 circuit and the power control circuit 104 operate independently of one another, the PAR control circuit is set up with a fixed tclip threshold and fixed gain stage optimized for the desired PAR and fixed peak signal required for the input dynamic range of the next stage. The tclip and gain settings are fixed regardless of the cutback being applied. As a result, a separate power control circuit 104 is implemented to apply all of the attenuation needed for the system cutback.

Moreover, the PAR control circuit 102 introduces additional problems itself. For example, the PAR control circuit 102 introduces nonlinear distortion into the system. The distortion, in turn, increases the splatter of the signal and introduces an irreducible bit error rate ("BER") floor. As a result, the overall quality of the transmitted signal is limited. Although the amount of distortion can typically be controlled at acceptable levels, the degradations can negatively affect system performance in several areas. Specifically, splatter can interfere with other users in close proximity on neighboring channels, and irreducible BER floor can degrade audio quality in voice systems and/or data throughput rates in data systems. Moreover, reduction in signal quality can also degrade mobility performance of the system. As a result of the PAR control circuit 102 being disconnected from the power control circuit 104, the tradeoff between signal quality and output power whenever the mobile station is not in a power limited environment is not being optimized.

BRIEF DESCRIPTION OF THE DRAWINGS

The above needs are at least partially met through provision of the power control technique described in the following detailed description, particularly when studied in conjunction with the drawings, wherein.

Figure 1:
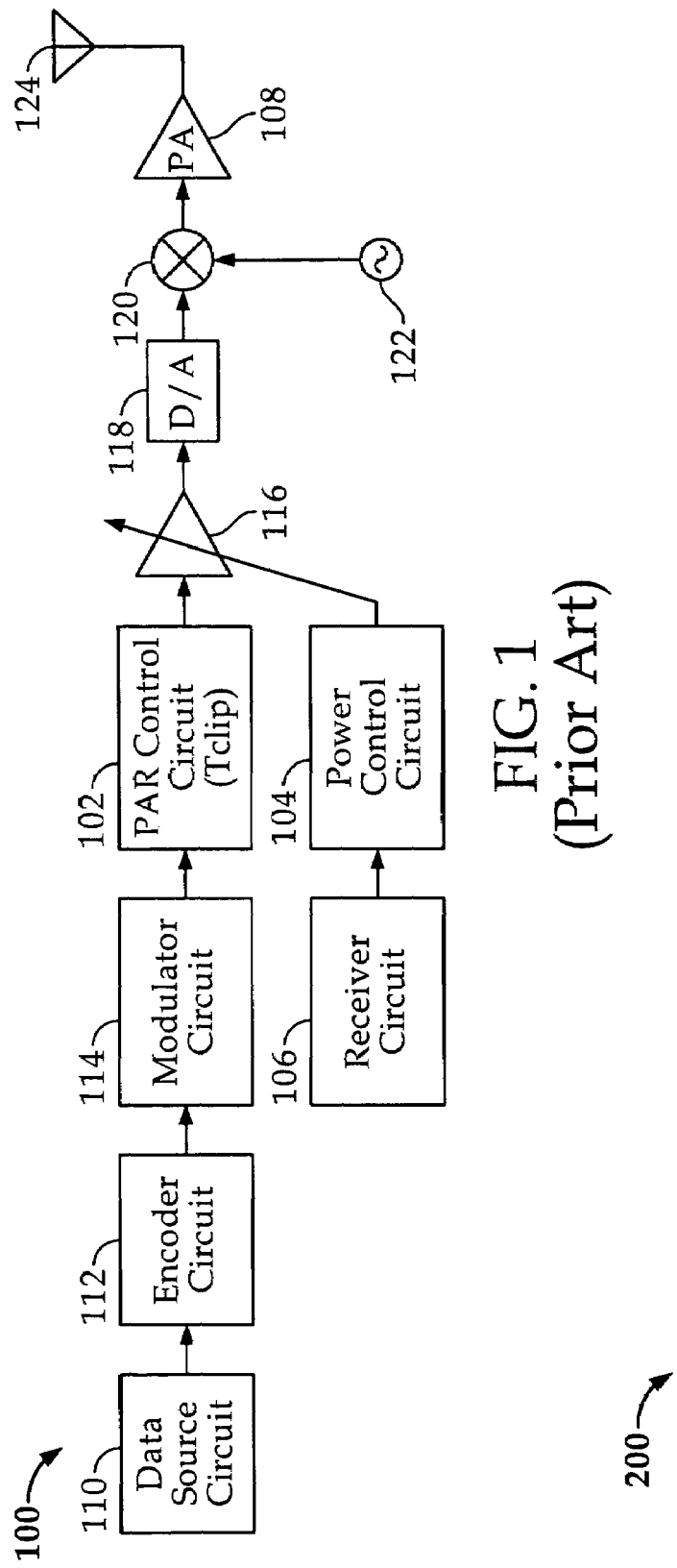
FIG. 1 comprises an illustration of a conventional power control system employing a PAR and power cutback.
Figure 2:
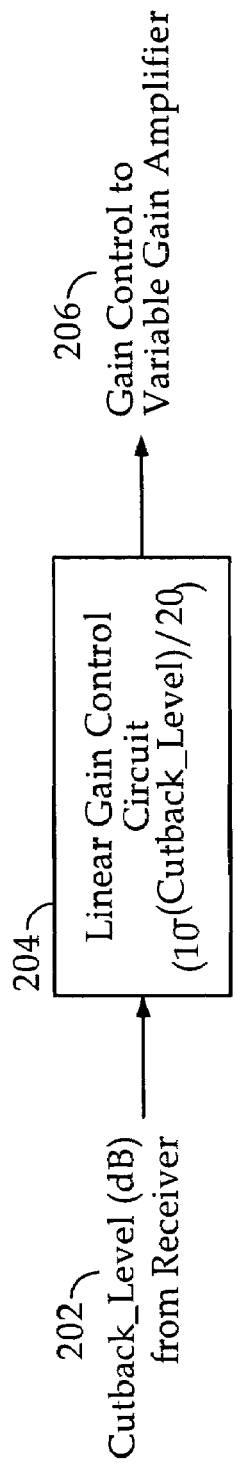
FIG. 2 comprises an illustration of a typical operation of a power control circuit shown in FIG. 1.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a power control technique is provided that assesses a tclip adjust value based on a maximum tclip adjust value when a power cutback value corresponds in at least a predetermined way to the maximum tclip adjust value, and otherwise, the tclip adjust value is assessed based on the power cutback value. In various teachings, some initial parameters are initialized responsive to the power cutback value being received from the receiver. In one specific embodiment, these parameters include the tclip adjust value, a peak power adjust value, an excess gain adjust value, and the maximum tclip adjust value. In various embodiments, the maximum tclip adjust value is based on a peak to average ratio ("PAR") unclipped value and a PAR clipped value. The tclip adjust value is further converted from a decibel value to a linear value to provide a converted tclip adjust value on which the peak power adjust value is based. In another embodiment, the excess gain adjust value is assessed based on the power cutback value and the maximum tclip adjust value, and the assessed excess gain adjust value is converted from a decibel value to a linear gain value. The excess gain adjust value is then assessed using the converted excess cutback value. In the various embodiment described, the assessed tclip adjust value and/or the assessed peak power adjust value are/is sent to a PAR control circuit. The assessed excess gain adjust value is sent to a variable gain amplifier in other embodiments.

Corresponding to the power control provided by the various teachings, a PAR control technique is also provided that assesses an adjust peak power signal based on the tclip adjust value received from the power control circuit. In one embodiment, the assessment of the adjust peak power signal is further based on the peak power adjust value received from the power control circuit, and a tclip value is also assessed based on the minimum tclip value and the tclip adjust value. In various embodiments described, a peak power control signal is assessed based on an output signal generated by a PAR control function. The adjust power signal is then assessed based on this peak power control signal and the peak power adjust value, and the adjust peak power signal is sent to a variable gain amplifier.

Through these various teachings, the present power control technique provides for PAR adjustments to be used as a means of power control in order to reduce the nonlinear distortion of the PAR control circuit. As a result, link performance is improved, especially in interference limited environments (e.g., users operating in close proximity to the serving cell). These interference limited environments are common in dense urban areas where many cells are located in close proximity to one another in order to satisfy capacity requirements or indoor/office environments that use many micro cells to cover small specific regions. In this case, the mobile station will frequently operate in a power cutback mode. There is, however, no benefit to aggressively limit the PAR when operating in power cutback, and in fact doing so can degrade system performance. Through the teachings of the various embodiments, however, the PAR is adjusted to reduce the nonlinear distortion. As a result, the amount of splatter that causes interference to other users is reduced. Moreover, by eliminating the residual BER floor, audio quality is improved and data throughput is also increased. A better mobility performance is further achieved through substantial elimination of erroneous measurement inquiries, which are triggered from insufficient signal quality margin. This improved mobility performance also results in better audio performance of systems that use bit stealing to transfer control information. The various embodiments are able to take full advantage of the PA in cutback mode, which is no longer operating at full power, and therefore are able to maintain linearity with a larger input PAR. Thus, the tradeoff between signal quality and output power is optimized, especially when the mobile station is not in a power limited environment.

Figure 3:
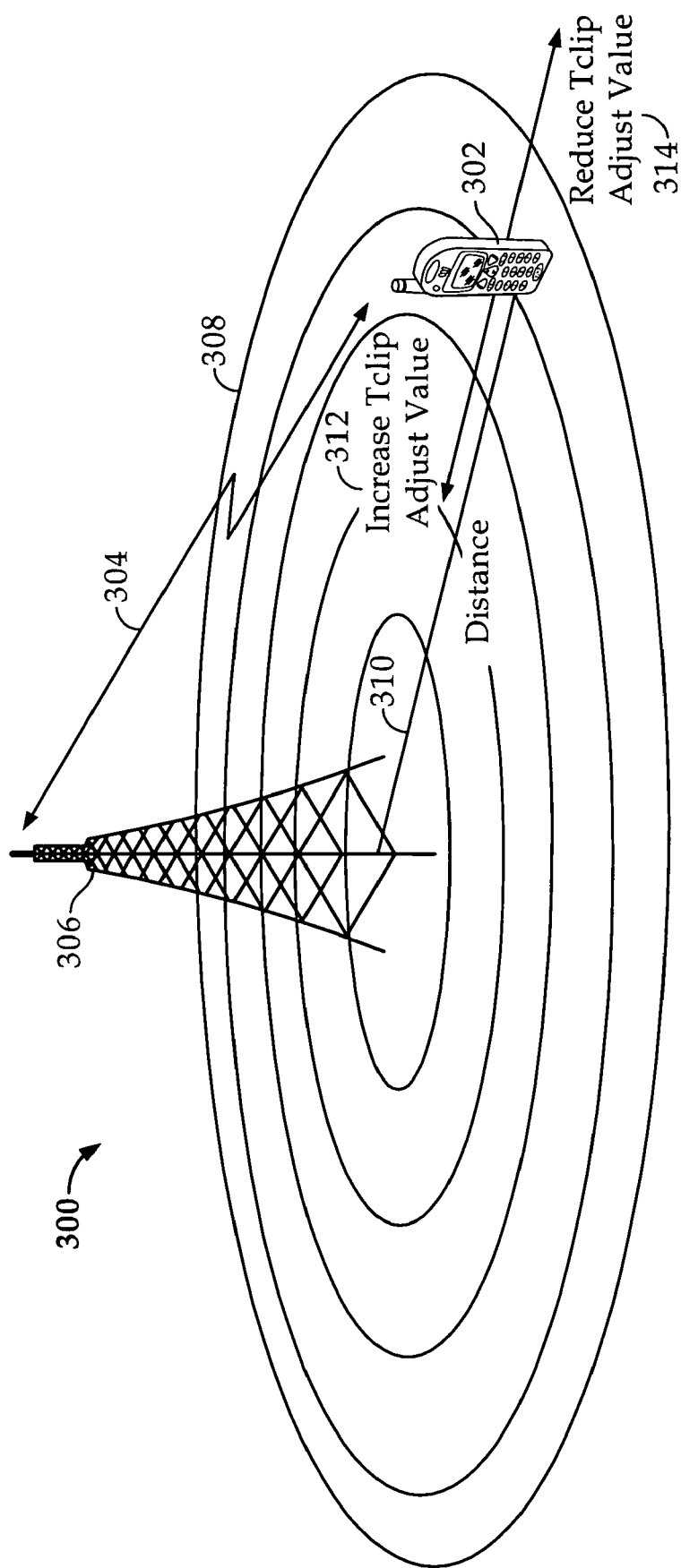
FIG. 3 comprises a power control system according to various embodiments.

Referring now to the drawings, and in particular to FIG. 3, for purposes of providing an illustrative but nonexhaustive example to facilitate this description, a specific operational paradigm using a communication system is shown and indicated generally at 300. Those skilled in the art, however, will recognize and appreciate that the specifics of this illustrative example are not exhaustive of the invention and that the teachings set forth herein are applicable in a variety of alternative settings. For example, since the various teachings are not platform dependent, they can be applied to broadcast and multimedia initiatives in any cellular communication system. Any digital broadcast services or digital satellite services are also applicable. In fact, a wired network implementation may also be suitable if it requires power control. As such, the various teachings described can be implemented in any network that may require power control of the mobile station as part of the normal operation of the network. Thus, these various platform and network implementations are within the scope of the invention, and various embodiments for these multiple implementations are readily understood and appreciated by one skilled in the art.

Pursuant to this example, a cellular telecommunication system 300 is provided with a single mobile station 302 communicating 304 with a serving base station 306 (one shown) via a cellular network 308. As the distance 310 between the mobile station 302 and the serving base station 306 decreases or increases, a tclip adjust value is accordingly increased 312 or decreased 314, respectively. Specifically, the tclip adjust value is increased 312 as the mobile station 302 moves closer to the serving base station 306, because less power is needed from the transmitter of the mobile station to carry out the communication with the base station. As a result, the power of the mobile station 302 is reduced by increasing the tclip adjust value. Similarly, as the mobile station 302 moves farther from the base station 306, more power is needed to effectuate communication with the base station. In this case, the tclip adjust value is decreased 312 to increase the power of the transmitter. According to various teachings described, the tclip adjust value is used to control the power of the mobile station.

Figure 4:
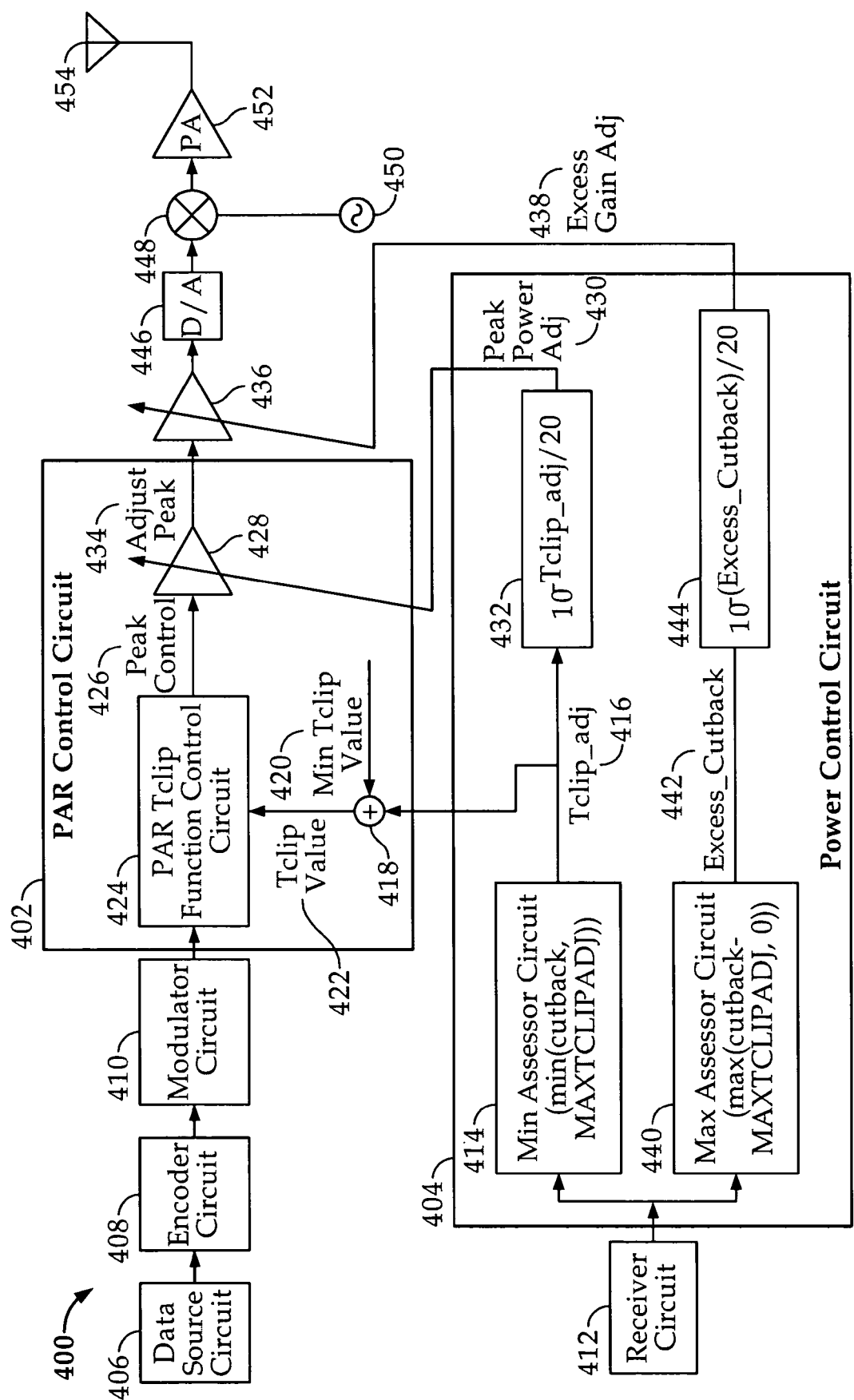
FIG. 4 comprises a power control process according to one embodiment.

Turning now to FIG. 4, a power control system according to various embodiments is shown and indicated generally at 400. In this control system shown, a PAR control circuit 402 is operably coupled to a power control circuit 404, and vice versa. It should be noted that circuit, as one skilled in the art readily appreciates, refers to any type of executable instructions that can be implemented as hardware, firmware, and/or software, which are all within the scope of the various teachings described. The PAR control circuit 402 is operably coupled directly or indirectly to a data source circuit 406, an encoder circuit 408, and a modulator circuit 410. Specifically, similar to the conventional system shown in FIG. 1, the data source circuit 406 that provides data to be transmitted is operably coupled to the encoder circuit 408 that protects the data from channel impairments. The encoder circuit 408 is, in turn, operably coupled to the modulator circuit 410 that formats the data for signaling across the channel. The PAR control circuit 402 controls the peak level of the signal from the modulator 410.

The power control circuit 404, also similar to the system described in FIG. 1, is operably coupled to a receiver circuit 412, which outputs a power cutback value to the power control circuit. Unlike the conventional power control system, however, the PAR control circuit 402 and the power circuit 404 work cooperatively in this embodiment shown. In particular, after the power control circuit 404 receives the power cutback value from the receiver circuit 412, a minimum assessor circuit 414 takes a minimum value of the power cutback value and predefined maximum tclip adjust value. This minimum value is outputted as a tclip adjust value 416 to an adder circuit 418 of the PAR control circuit 402. The adder circuit 418, in turn, adds a minimum tclip value 420 to the tclip adjust value 416 from the power control circuit 404. This added value is outputted as a tclip value 422 to a PAR function control circuit 424 that sets a peak power control signal 426 based on the tclip value 422 using the PAR control tclip function, which is commonly known in the art. The peak power control signal 426 generated by the PAR tclip function control circuit 424 is then outputted to a first variable gain amplifier 428 in the PAR control circuit 402.

In addition to receiving the peak power control signal 426 from the PAR tclip function control circuit 424, the first variable gain amplifier 428 receives a peak power adjust value 430 output from a tclip adjust linear converter circuit 432 of the power control circuit 404. Specifically, the tclip adjust linear converter circuit 432 converts the tclip adjust value 416 from the minimum assessor circuit 414 and sets the converted tclip adjust value as the peak power adjust value 430, which is outputted to the first variable gain amplifier 428. The peak power control signal 426 from the PAR tclip function control circuit 424 and this peak power adjust value 430 are multiplied in the first variable amplifier 428 to generate an adjust peak power signal 434 that is outputted to a second variable gain amplifier 436, which also receives an excess gain adjustment value 438 from the power control circuit 404. Specifically, a maximum assessor circuit 440 of the power control circuit 404 generates an excess cutback value 442 based on a maximum value of the power cutback value received from the receiver, the predefined maximum tclip adjust value, and zero. This excess cutback value 442 is outputted to an excess cutback linear converter circuit 444 that converts it from a decibel value to a linear value and outputs the converted excess cutback value as the excess gain adjust value 438.

The second variable gain amplifier 436 outputs the product of the adjust peak power signal 434 from the first variable gain amplifier 428 and the excess gain adjust value from the power control circuit 404 to a digital-to-analog ("D/A") converter circuit 446 that converts digital input signals into analog signals, which are then outputted to a mixer 448. The mixer 448 is also operably coupled to a local oscillator 450 that translates the input signal to RF based on inputs from the local oscillator. The RF signal is then outputted to a PA 108 for amplification, which is connected to an antenna 124 that couples the RF signal to the channel.

As shown, since the PAR control circuit 402 and the power control circuit 404 operate cooperatively in the various embodiments shown, both nonlinear distortion and the average transmit power needed to reach the system cutback level are both achieved. The PAR control tclip and the gain of the PAR control circuit 402 are no longer fixed, but instead they are dynamically controlled by the power control circuit 404. In various embodiments shown, as cutback is needed in the system, the tclip is relaxed by the amount of the cutback. Thus, the level of the signal peaks is increased. The effect of passing higher peaks without clipping is a reduction in the level of nonlinear distortion on the signal. The variable gain stage and the core PAR control of the PAR control circuit have been customized to work with these inputs from the power control circuit. The variable gain stage reduces the gain of the PAR control for achieving the cutback needed, resulting in no change in peak power and an increase in PAR based on the tclip adjust value corresponding to the cutback level. In other words, the PAR is increased while at the same time a constant peak signal out of power control circuit 404 is maintained. Moreover, by relaxing the tclip and scaling the clipped signal in this manner, the average power has been reduced by the cutback level. This, in turn, satisfies the cutback requirement of the system while increasing the PAR by the same amount as the cutback requirement, resulting in the reduction of the nonlinear distortion.

Figure 5:
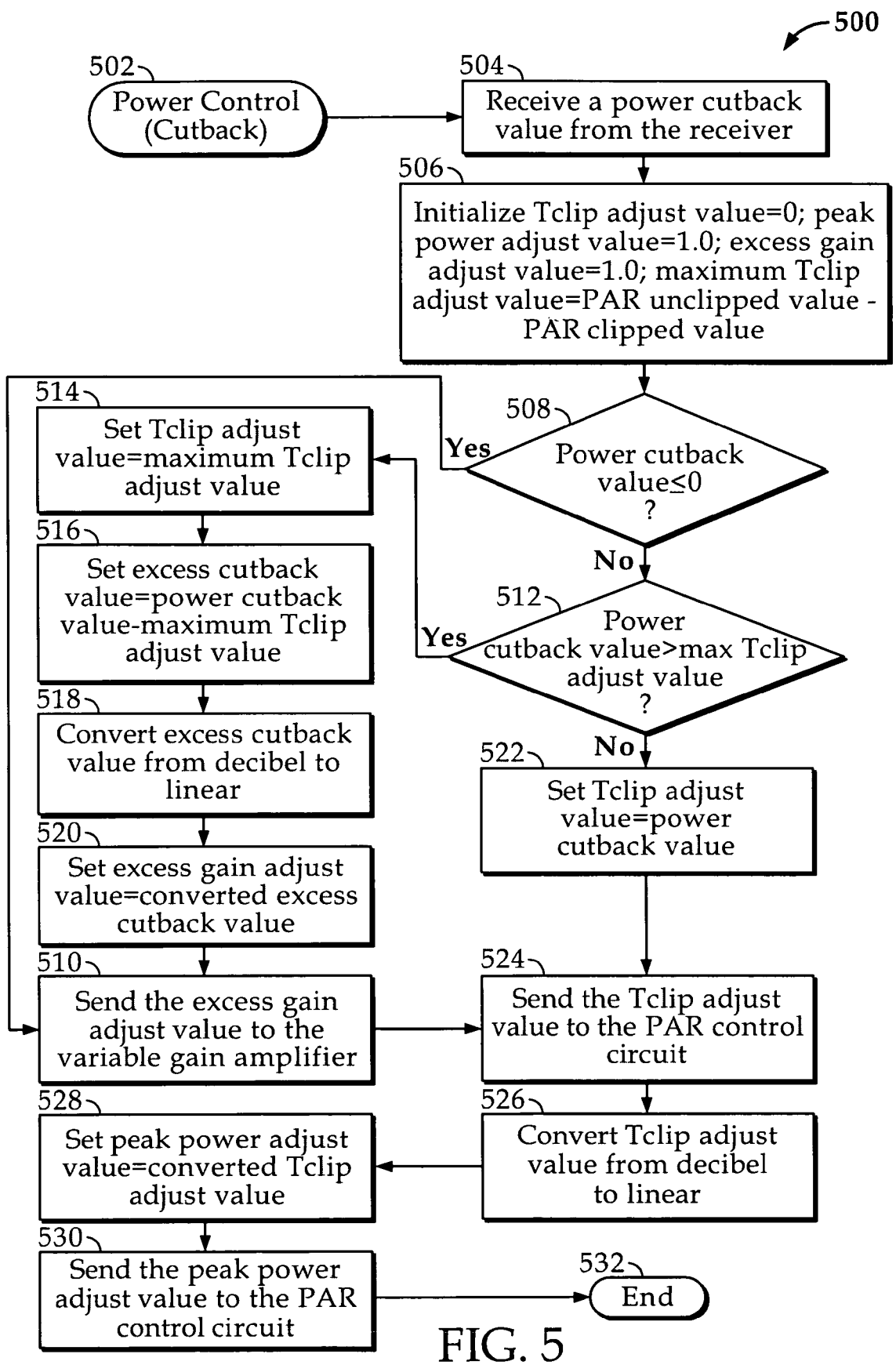
FIG. 5 comprises a power control process according to one embodiment.

Referring to FIG. 5, a power control process according to one embodiment is shown and indicated generally at 500. The power control process starts 502 when a power cutback value is received 504 from the receiver. In response to the received cutback value, some variables are initialized 506. Specifically, in this embodiment shown, the tclip adjust value is set to zero, the peak power adjust value and the excess gain adjust value are set to 1.0, and the maximum tclip adjust value is set to the PAR unclipped value minus the PAR clipped value. Of course, as readily appreciated by a skilled artisan, other initial values that are specific to the implementation can also be used, but as an example, these initial values are provided as a practical implementation contemplated. In fact, any of the processes shown can be easily altered to accommodate different implementations. As a result, the various teachings are not limited to the processes described, and other alternative processes, although not specifically shown, are within the scope of the teachings of the various embodiments.

In this particular exemplary power control process shown, once the variables have initialized 506, it is determined 508 whether the power cutback value is less than or equal to zero. If so, the excess gain adjust value, which would be its initial value, is sent 510 to the variable gain amplifier. If, on the other hand, the power cutback value is not less than or equal to zero, it is next determined 512 whether the power cutback value corresponds at least in a predetermined way, specifically greater than in this embodiment shown, the maximum tclip adjust value. If this is true, the tclip adjust value is set 514 to the maximum tclip adjust value, and the excess cutback value is set 516 to a value that is based on the power cutback value and the maximum tclip adjust value. In particular, in this exemplary process shown, the value is obtained from subtracting the maximum tclip adjust value from the power cutback value. The excess cutback value is then converted 518 from a decibel to a linear value, which is then set 520 as the excess gain adjust value. The excess gain adjust value is sent 510 to the variable gain amplifier. Note that different values of the excess gain adjust are sent to the variable gain amplifier, depending on the outcome of the comparison 512 of the power cutback value and the maximum tclip adjust value.

The tclip adjust value is also different depending on the outcome of the comparison 512 of the power cutback value and the maximum tclip adjust value. In particular, with the case of the power cutback value being not greater than the maximum tclip adjust value, the tclip adjust value is set 522 to the power cutback value from the receiver, instead of the maximum tclip adjust value in the other case. Accordingly, the assessed tclip adjust value is sent 524 to the PAR control circuit. The tclip adjust value is also converted 526 from decibel value to a linear value to asses the peak power adjust value. Specifically, in this embodiment shown, the peak power adjust value is set 528 as the converted tclip adjust value, and the peak power adjust value is similarly sent 530 to the PAR control circuit for processing. The power control ends 532 at this point. From the power control process, the tclip adjust value and the peak power adjust value have been sent to the PAR control circuit, and the excess gain adjust value has been sent to the variable gain amplifier, which would ultimately affect the PAR and the power of the PA.

Figure 6:
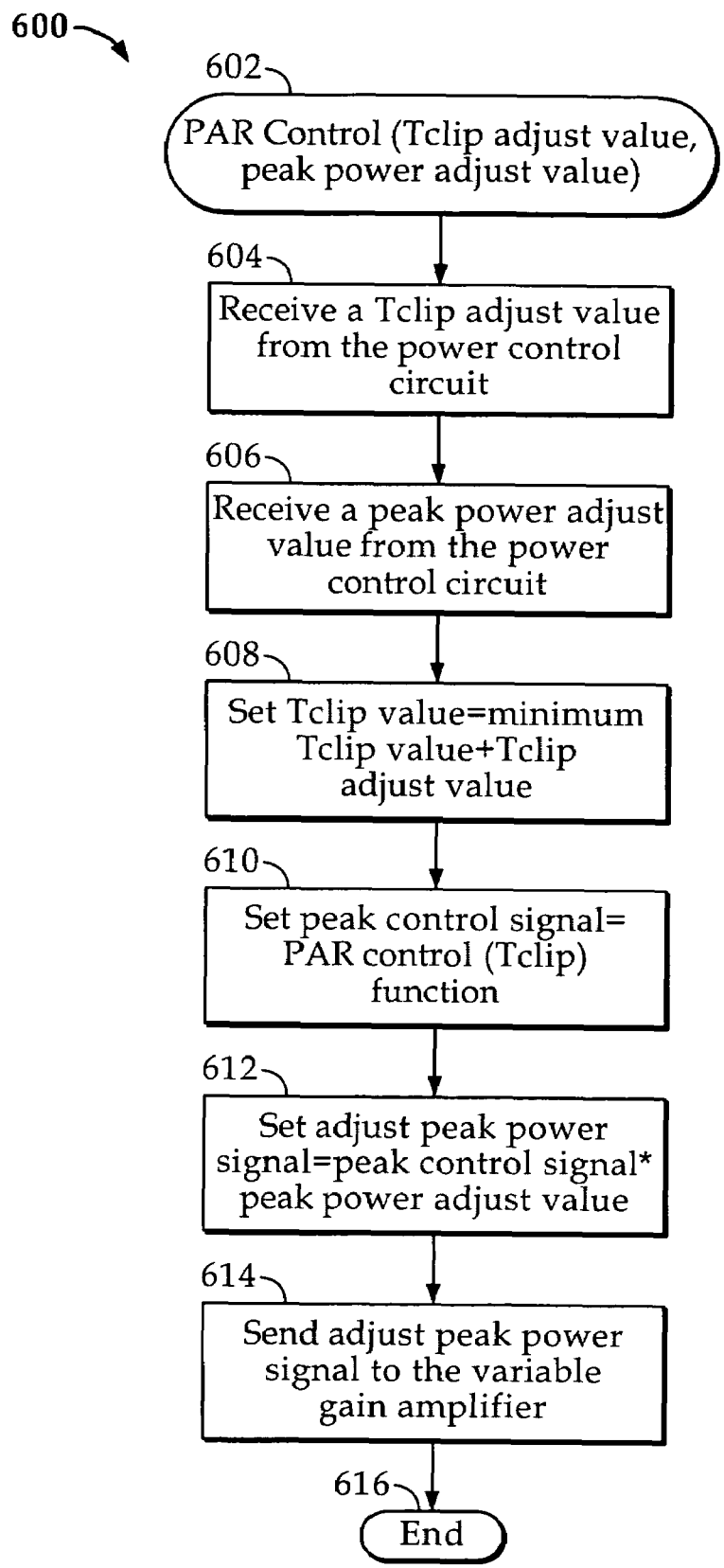
FIG. 6 comprises a peak to average control process according to one embodiment.

Turning now to FIG. 6, the PAR control process according to an embodiment is shown and indicated generally at 600. This process is initialized 602 with the receipt 604, 606 of the tclip adjust value and the peak power adjust value from the power control circuit. Using the tclip adjust value from the power control circuit, the tclip value is assessed 608. Specifically, it is set to a value obtained from adding the minimum tclip value to the tclip adjust value. The tclip is used as the parameter for the PAR control tclip function, which is commonly known in the art, to generate 610 the peak power control signal. The adjust peak power signal is, in turn assessed 612. In this embodiment, the adjust peak power signal is a multiplied value of the peak power control signal and the peak power adjust value. The adjust peak power signal is then sent 614 to the variable gain amplifier, and the process ends 616.

Through the various embodiments shown, an improved and novel power control technique has been provided that allows the PAR control circuit and the power control circuit to operate cooperatively. The PAR is adjusted corresponding to the power control in order to reduce the nonlinear distortion caused by the PAR control circuit. The tclip value and the gain of the PAR control circuit are no longer fixed. Rather, these values are now dynamically provided through the power control circuit. With the nonlinear distortion being reduced, the amount of splatter that causes interference to other users in the system is, in turn, reduced. The residual BER floor is further substantially eliminated. As a result, the audio quality and the data throughput are improved, which translates to better mobility performance that avoids erroneous measurement inquiries. Because the various embodiments are able to take full advantage of operating the PA in the cutback mode, sufficient power can be provided that is capable of maintaining linearity with a larger input PAR. The tradeoff between the signal quality and the output power is, thus, optimized.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method of controlling power on a mobile station comprising:
   determining whether a power cutback value corresponds in at least a predetermined way to a maximum tclip adjust value;
   assessing a tclip adjust value based on the maximum tclip adjust value when the power cutback value corresponds in at least the predetermined way to the maximum tclip adjust value; and
   assessing the tclip adjust value based on the power cutback value when the power cutback value does not correspond in at least the predetermined way to the maximum tclip adjust value;
   wherein assessing the tclip adjust value further comprises:
   assessing an excess cutback value based on the power cutback value and the maximum tclip adjust value;
   converting the excess cutback value from a decibel value to a linear gain value; and
   assessing an access gain adjust value based on the converted excess cutback value.

2. The method according to claim 1, wherein the maximum tclip adjust value is based on a peak to average ratio unclipped value and a peak to average ratio clipped value.

3. The method according to claim 1 further comprising:
   sending the tclip adjust value to a peak to average ratio control circuit.

4. The method according to claim 1 further comprising:
   converting the tclip adjust value from a decibel value to a linear value to provide a converted tclip adjust value;
   assessing a peak power adjust value based on the converted tclip adjust value.

5. The method according to claim 4 further comprising:
   sending the peak power adjust value to a peak to average ratio control circuit.

6. The method according to claim 1 further comprising:
   receiving the power cutback value from a receiver;
   initializing any one or more selected from a group comprising the tclip adjust value, a peak power adjust value, the excess gain adjust value, and the maximum tclip adjust value.

7. The method according to claim 1 further comprising:
   sending the excess gain adjust value to a variable gain amplifier.

8. A method of controlling a peak to average ratio comprising:
   receiving a tclip adjust value from a power control circuit;
   assessing an adjust peak power signal based on the tclip adjust value;
   receiving a peak power adjust value from the power control circuit;
   assessing the adjust peak power signal further based on the peak power adjust value;
   wherein assessing the adjust peak power signal further comprises:
   assessing a tclip value based on a minimum tclip value and the tclip adjust value;

assessing a peak power control signal based on an output signal generated by a peak to average ratio control function;

assessing the adjust peak power signal based on the peak power control signal and the peak power adjust value.

9. The method according to claim 8 further comprising:
sending the adjust peak power signal to a variable gain amplifier.

10. An apparatus for controlling power on a mobile station comprising:

a receiver circuit having a power cutback value;

a power control circuit operably coupled to the receiver circuit, wherein the power control circuit assesses a tclip adjust value based on the power cutback value;

a peak to average ratio control circuit operably coupled to the power control circuit, wherein the peak to average ratio control circuit assesses an adjust peak power signal based on the tclip adjust value;

wherein the power control circuit provides a peak power adjust value to the peak to average ratio control circuit and the peak to average ratio control circuit further assesses the adjust peak power signal based on the peak power adjust value;

wherein the peak to average ratio control circuit also assesses a tclip value based on a minimum tclip value and the tclip adjust value, assesses a peak power control signal based on an output signal of a peak to average ratio control function and assesses the adjust peak power signal based on the peak power control signal and the peak power adjust value.

11. The apparatus as defined in claim 10 further comprising:

a variable gain amplifier operably coupled to the peak to average ratio control circuit, wherein the variable gain amplifier adjusts power of the mobile station based on an excess gain adjust value.

12. The apparatus as define in claim 10, wherein the power control circuit comprises an assessing means for assessing the tclip adjust value.

13. The apparatus as defined in claim 10, wherein the peak to average ratio control circuit comprises an assessing means for assessing the adjust peak power signal.

14. The apparatus as defined in claim 10, wherein the power control circuit assesses the tclip adjust value based on a maximum tclip adjust value when the power cutback value corresponds in at least a predetermined way to the maximum tclip adjust value, otherwise the tclip adjust value is assessed based on the power cutback value.

15. The apparatus as defined in claim 10, wherein the power control circuit further assesses peak the power adjust value based on the assessed tclip adjust value.

16. The apparatus as defined in claim 10, wherein the power control circuit further assesses an excess gain adjust value based on the power cutback value.

* * * * *